United States Patent [19]
Hirsch

[11] 4,033,375
[45] July 5, 1977

[54] TWO-WAY FLUID PRESSURE RELIEF VALVE
[75] Inventor: Arthur Edward Hirsch, Terre Haute, Ind.
[73] Assignee: J. I. Case Company, Racine, Wis.
[22] Filed: May 7, 1976
[21] Appl. No.: 684,400
[52] U.S. Cl. .......................................... 137/493.9
[51] Int. Cl.[2] ............................................ F16K 15/00
[58] Field of Search ............... 137/493, 493.8, 493.9

[56]  References Cited
UNITED STATES PATENTS

| | | | |
|---|---|---|---|
| 2,934,080 | 4/1960 | Rice | 137/493.9 X |
| 2,955,613 | 10/1960 | Block | 137/493.9 |
| 3,437,065 | 4/1969 | Robbins | 137/493.9 UX |

FOREIGN PATENTS OR APPLICATIONS 1,200,624  9/1965  Germany .................... 137/493.8

Primary Examiner—Robert G. Nilson
Attorney, Agent, or Firm—Arthur J. Hansmann

[57] ABSTRACT

A two-way fluid pressure relief valve having a valve body and two valve seats therein and two valve closure pieces operable on the seats. Springs force the closure pieces against the seats, and the fluid pressure will act in both directions for removing the closures from the seats and causing fluid pressure relief. A movable member engages the closure pieces to remove them from the seats and to also fluid-tightly seal with them up to the point of fluid pressure relief created by the springs.

3 Claims, 3 Drawing Figures

TWO-WAY FLUID PRESSURE RELIEF VALVE

This invention relates to a two-way fluid pressure relief valve.

BACKGROUND OF THE INVENTION

Fluid pressure relief valves already exist and are known in the prior art in many different configurations. These valves are normally provided for the purpose of permitting a limit, and thereby a relief, in the fluid pressure existing in the fluid line or other fluid container. As such, the valve normally is self-operating in responding to a certain fluid pressure to thereby open up and allow the fluid to pass through the valve and thereby release the original pressure in the fluid. Further, the prior art usually has these valves arranged so that the valve is operative in only a single direction, namely the exit direction of the flow of fluid from the fluid line or container or whatever element is enclosing the fluid under pressure. Even still further, the prior art is aware of fluid pressure relief valves which are self-actuating for relieving the pressure and which are also self-actuating for resetting the closure or valve element to re-establish the original pressurized condition. As such, the prior art valves are reusable and are continuously operative and available for controlling the limit of fluid pressure in a fluid line or other container.

The present invention provides a two-way fluid pressure relief valve which accomplishes the aforementioned objectives and does so in the two-way flow of the fluid through the valve itself so that fluid pressure can be relieved in either direction of flow in a hydraulic line, for instance, or the valve can be utilized for relieving fluid pressure between two otherwise separated fluid lines or containers such that either line or container can be relieved of fluid pressure by the use of a single and two-way fluid pressure relief valve.

Still another object of this invention is to provide a two-way fluid pressure relief valve which accomplishes the aforementioned objectives, of both the prior art and of this invention, and which does so by means of a valve structure which is readily and easily provided and is inexpensive and sturdy and reliable in its construction and function and wherein the valve is self-actuating and resets itself for continuous and repeated use and response to the relief of the desired fluid pressure.

Still further, the present invention provides a two-way fluid pressure relief valve which can be readily and easily arranged so that two different pressures can be relieved by the valve, one in each direction of fluid flow through the valve, and this is primarily accomplished by the utilization of different spring forces acting on two closure members which establish the relief in each of the two ways of fluid flow through the valve. Still further, the present invention accomplishes the aforementioned objectives and provides the relief valve which can be used in crossover relief valves and combination relief and anti-cavitation check valves. Likewise, in the valve of this invention wherein two springs are used for controlling the relief of the fluid pressure, where one spring is of a light force compared to the other spring, the valve can be utilized as a combination relief valve in one direction and a check valve in the other direction, relative to fluid flow through the valve. Accordingly, the two-way valve of this invention can be used as either a two-way relief valve for relieving equal pressures in each direction, or it can be used as a two-way relief valve for relieving unequal fluid pressures in the two directions, or it can be used as a combination relief valve for flow in one direction and a check valve for flow in the other direction.

Other objects and advantages will become apparent upon reading the following description in light of the accompanying drawings.

DETAILED DESCRIPTION OF THE PREFERRED EMBODIMENT

Figure 1:
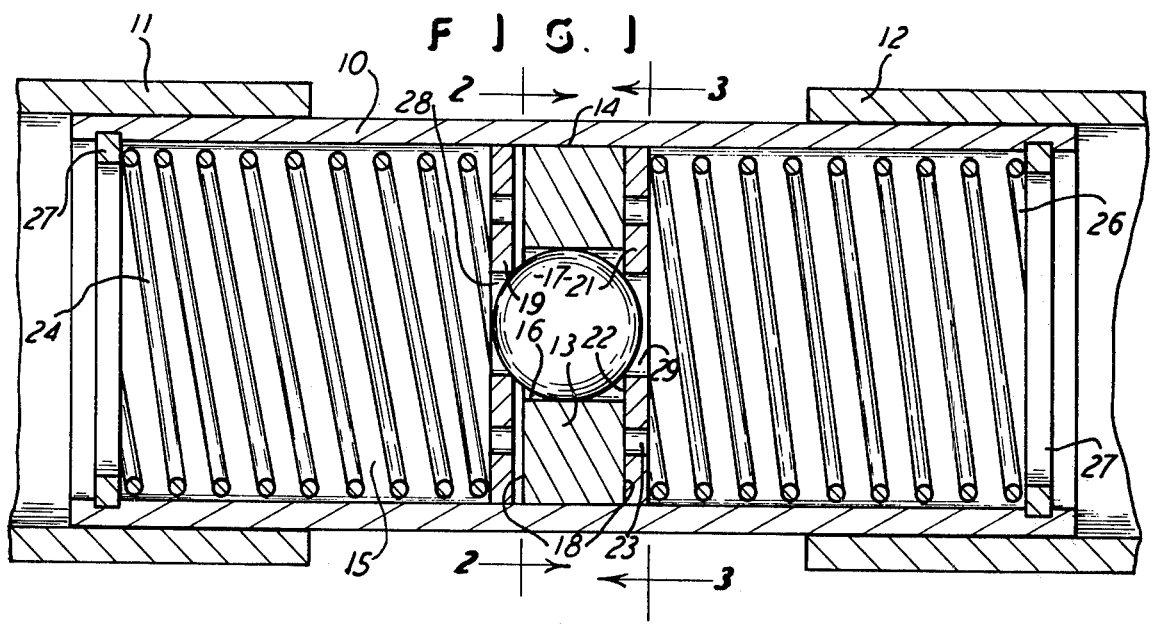
FIG. 1 is a longtudinal sectional view through a preferred embodiment of a valve of this invention.
Figure 2:
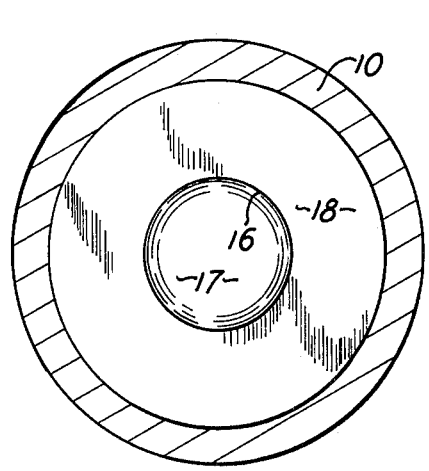
FIGS. 2 and 3 are sectional views respectively taken along the lines 2—2 and 3—3 of FIG. 1.
Figure 3:
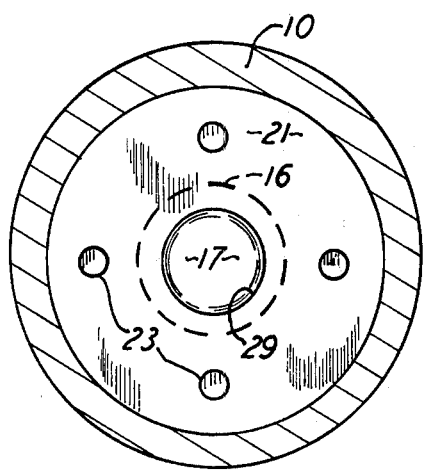

The drawings show one arrangement of a two-way fluid-pressure relief valve of this invention, and, as such, a valve body 10 is shown to be of tubular configuration having an intermediate fluid chamber 15 through which fluid can flow in either direction and along the longitudinal axis of the elongated body 10. Also the valve and its body 10 may have tubular fluid lines 11 and 12 fluid-tightly attached thereto, and the lines 11 and 12 may be tubes or hoses or any other fluid containers or conductors which restrict and direct the fluid relative to the valve itself. A piece 13 is shown disposed on the interior of the body 10, and it is actually in the form of a circular wall which is affixed with the body 10 and is fluid tight therewith at the juncture designated 14, and the wall 13 may be an integral part of the body 10 or may be otherwise affixed with the body 10 to be in the set position therewithin. The wall 13 is therefore of a configuration projecting into the chamber 15, and it has a circular opening 16 extending therethrough and in the form of a fluid passageway which conducts the flow of fluid through the chamber 15 from opposite ends of the valve body 10.

A spherical member or ball 17 is movably disposed in the opening 16 and is of an outer diameter comparable to the diameter of the circular opening 16 so that the ball 17 is snug within the opening 16 but is movable in the direction of the axis of the opening 16, that is to the left and to the right as viewed in FIG. 1. The wall 13 has planar end surfaces or faces 18 which present valve seats extending across the inner diameter of the valve body 10, and plates 19 and 21 are disposed adjacent the valve seats 18 and have planar surfaces 22 which can actually abut the surfaces or seats 18 and which are fully in contact with the surfaces or seats 18, as shown by the plate 21 which is against the adjacent seat 18. That is, the plates 19 and 21 are movable along the axis of the valve body 10, and they are thus movable toward and away from the valve seats 18, and the plates 19 and 21 are therefore valve closure pieces which are available for controlling the flow of fluid through the valve body 10, in a manner described hereinafter.

The closure pieces 19 and 21 have a plurality of fluid passageways 23 extending therethrough, and the passageways 23 align with the valve seats 18 which are actually annularly shaped and extend as mentioned and around the central opening 16 of the center piece 13. Thus, the fluid passageways 23 in the valve closure pieces 19 and 21 are available for the passage of fluid therethrough, when the pieces 19 and 21 are not in their closed or seated positions relative to the seats 18, and that would be the position of the piece 19 as shown in the FIG. 1 position. That is, the piece 19 is shown off the seat 18, and thus fluid could flow through the several passageways 23 in the piece 19. However, the piece 21 is shown in abutment with or on the valve seat 18, and thus the fluid cannot flow through the several passageways 23 in the piece 21 while the piece 21 is in the position shown in FIG. 1. The valve also includes the compression springs 24 and 26 which extend between the snap rings or supports 27, which are in a set position in the body 10, and the closure pieces 19 and 21. As such, the springs 24 and 26 yieldingly urge the closure pieces 19 and 21 toward their respective valve seats 18, such as shown with respect to the closure piece 21 which has been urged to its seated position by its spring 26. As will be more fully mentioned later, the springs 24 and 26 may be of equal force-applying capacity, or they may be different.

Finally, the valve closure includes the sphere or ball 17 which is shown to be in constant contact with both the closure plates 19 and 21 which also have the central fluid passageways 28 and 29, respectively, and those are circular in shape and extend through the plates 19 and 21, as shown. As such, the sphere 17 is co-axial with the co-axial openings 28 and 29, and the respective plates 19 and 21 can fluid-tightly seal with the plates 19 and 21 and relative to the openings 28 and 29.

That is, in the position shown in FIG. 1, the closure piece 21 is on the valve seat 18, and thus there is no fluid flowing through the openings 23 when there is fluid pressure in the right-hand end of the valve body 10, that is in the line 12, as seen in FIG. 1. Also, the spring 24 and the plate 19 bear against the sphere 17 which is therefore held fluid-tightly in the opening 29 of the plate 21, and thus there can be no flow through the opening 29. Accordingly, fluid pressure on the right-hand end of the valve, as viewed in FIG. 1, cannot pass beyond the plate 21 and be presented to the left side of the plate 21, as viewed in FIG. 1. However, if the fluid pressure in the line 12 and the right-hand side of the valve 10 is sufficiently great where it bears against the exposed area of the sphere 17 in the opening 29, the sphere 17 will be forced against the closure plate 19 to thus overcome the yielding force of the spring 24, and this will permit fluid to move through the opening 29 and through the passageway 16 and past the shpere 17 which is dimensioned relative to the opening 16 to permit the flow through the opening 16, as being described herein. Of course the fluid flowing past the sphere 17 and through the opening 16, as described, will then flow through the passageways 23 in the plate 19 and thereby be relieved or continue on into the tube or hose 11.

Conversely, if the fluid pressure were in the left-hand end of the unit, as viewed in FIG. 1 and that would be with pressure in the tube or hose 11, then the valve closure members of the plates 19 and 21 and the sphere 17 would be shifted to the right, from the FIG. 1 position, and the relief of pressure would be effective in the direction and in the manner opposite from that just described. Accordingly, if the force of the springs 24 and 26 is equal on the respective plates or discs 19 and 21, then the first condition of a two-way fluid pressure relief valve for relief of equal pressure in two directions is accomplished.

Next, if the force of the springs 24 and 26 is of a different magnitude on the respective discs 19 and 21, then there is still provided a two-way fluid pressure relief valve but one of different relief magnitude in the respective two ways. That is, the spring 24 may be of a lighter force than that of the spring 26 (and this is a condition shown in FIG. 1 when it is assumed that there is no fluid pressure in the valve body 10). As such, the fluid pressure in the right-hand end of the valve unit 10 would be relieved at a lower magnitude as it bears against the spring 24, compared to the fluid pressure relief point of fluid in the left-hand end of the valve 10, which pressure would bear against the spring 26 to achieve relief.

Finally, the valve unit of this invention can also be used as a combined relief valve and check valve, and this could be accomplished by having a significant force differential between the springs 24 and 26. Accordingly, the spring 26 could be of a substantially higher force than that of the spring 24 and fluid pressure in the right-hand end of the valve 10 would be restricted to the extent of the force of the spring 24, and the valve would therefore act as a relief valve. Additionally, fluid pressure in the hose 11 would be restricted from flowing toward the hose 12, and thus the unit would act as a check valve when the spring 26 is of a strong force compared to that of the spring 24.

As such, the valve of this invention is provided with the valve seats and the closure members described. The seats 18 are faced oppositely from each other and the valve closure includes the three pieces 17 and 19 and 21, and the diameter of the spherical piece 17 is greater than the space or dimension between the valve seats 18, as shown in FIG. 1. Also, as mentioned, the circumference or outer surface of the sphere 17 is fluid tight with the pieces 19 and 21 since the sphere 17 projects slightly into the respective openings 28 and 29 and can be held therein to be fluid tight, under the urging of the springs 24 and 26, as described above. With this dimensional arrangement of the sphere 17 and the spacing of the seats 18, only 1 closure member 19 and 21 may be on its respective seat 18 at any one time. Also, the pieces 19 and 21 are described and shown as being snugly disposed in the circular interior of the valve body 10, but of course the pieces 19 and 21 move within the body 10 for the functioning described, and the respective inner faces 22 of the discs or plates 19 and 21 fluid-tightly seal with the valve seats 18 under the force of the respective springs 24 and 26, as described.

What is claimed is:

1. A two-way fluid pressure relief valve comprising a valve body having a fluid-flow chamber extending therein, two valve seats disposed spaced apart in said chamber and faced oppositely from each other, a movable valve closure disposed in said chamber and having a plurality of pieces with two of said pieces being movable and fluid-tightly seatable on a respective one of said two valve seats, a spring in said body and operative on each of said two closure pieces and yieldably urging said pieces to their respective seated positions on said valve seats, said valve closure including a spherically-shaped piece disposed between said valve closure two pieces and exposed to fluid pressure in said chamber and movable in response to fluid pressure in said chamber and engagable with said two pieces for respective unseating of said two pieces against the urging of said spring, the diameter of said spherically-shaped piece being greater than the spacing between said two valve seats, such that only one at a time of said valve closure two pieces can seat on its said valve seat.

2. A two-way fluid pressure relief valve comprising a valve body having a fluid-flow chamber extending therein, a wall extending into said body and having two oppositely faced surfaces presenting two spaced-apart valve seats disposed in said chamber and faced oppositely from each other, said wall having a fluid passageway therethrough and extending between said surfaces and in fluid-flow communication with said chamber, a movable valve closure disposed in said chamber and having a plurality of pieces with two of said pieces being movable and fluid-tightly seatable on a respective one of said two valve seats, a force-applying member in said body and operative on each of said two closure pieces and yieldably urging said pieces to their respective seated positions on said valve seats, said valve closure including a third movable piece exposed to fluid pressure in said chamber and movable in response to fluid pressure in said chamber and engagable with said two pieces for respective unseating of said two pieces against the urging of said force-applying member, and said third movable piece being disposed in said fluid passageway and of a dimension greater than the spacing apart of said two valve seats, such that only one at a time of said valve closure two pieces can seat on its said valve seat.

3. The two-way fluid pressure relief valve as claimed in claim 2, wherein said valve closure two pieces are planar pieces with end surfaces parallel with said wall two surfaces and having fluid passageways extending therethrough and alternately and singly alignable and fluid tight with said valve seats and with said third movable piece when respectively in contact with said valve seats and said third movable piece.

* * * * *